United States Patent [19]

Broding

[11] 4,010,442
[45] Mar. 1, 1977

[54] STATUS DISPLAY FOR SEISMOMETER-GROUP RECORDER OPERATIONS

[75] Inventor: Robert A. Broding, Tulsa, Okla.

[73] Assignee: Standard Oil Company, Tulsa, Okla.

[22] Filed: Apr. 25, 1975

[21] Appl. No.: 572,493

[52] U.S. Cl. .................. 340/15.5 TS; 340/224; 340/408; 346/3
[51] Int. Cl.² .................. G01V 1/22; H04B 7/14
[58] Field of Search ............ 340/15.5 TS, 15.5 DP, 340/151, 224, 408; 346/3; 343/6.8

[56] References Cited
UNITED STATES PATENTS

| | | | |
|---|---|---|---|
| 3,161,731 | 12/1964 | Seeley | 340/408 |
| 3,508,260 | 4/1970 | Stein | 343/6.5 |
| 3,517,316 | 6/1970 | Anderson et al. | 340/224 |
| 3,806,864 | 4/1974 | Broding et al. | 340/15.5 TS |
| 3,852,740 | 12/1974 | Haymes | 340/224 |
| 3,881,166 | 4/1975 | Fort et al. | 340/15.5 TS |
| 3,886,494 | 5/1975 | Kostelnicek et al. | 340/15.5 TS |
| 3,946,357 | 3/1976 | Weinstein et al. | 340/15.5 CP |

*Primary Examiner*—Nelson Moskowitz
*Attorney, Agent, or Firm*—Newell Pottorf

[57] ABSTRACT

Seismometer group recorders amplify and make reproducible recordings of one or more seismometers employed in geophysical prospecting. There is no recording of the various groups at the controller instrument truck, as is common in the prior art. The operator needs assurance prior to collecting data through such recorders that the selectively activated group recorders (always considerably less than the total number placed in the field) are ready for the recording. This disclosure describes means for accomplishing such a status display which identifies those group recorders which have been turned on by the radio transmission system or equivalent, verifying that as to each recorder there is available recording medium, proper switching on of the power source, etc.

1 Claim, 4 Drawing Figures

STATUS DISPLAY FOR SEISMOMETER-GROUP RECORDER OPERATIONS

REFERENCES TO RELATED APPLICATIONS

A related application by the same inventor is Ser. No. 529,308, "Group Recorder Alarm." Another in this field is Ser. No. 562,282, Mr. Francis R. Freeman, entitled "Seismometer-Group Recorder Field Monitor."

BACKGROUND OF THE INVENTION

1. Field of the Invention

This invention relates to seismic prospecting, used for depicting the presence and geometry of subsurface geological strata. As such, it is widely employed for petroleum exploration, as well as for other purposes. This is classified in the Patent Office under Classes 340/15.5 Ts, 346/14 MR, 346/33 C, and 340/15.5 DP.

2. Description of the Prior Art

It is believed that no technical description of geophysical exploration need be given, in view of the number of modern textbooks that have dealt with this topic. A considerable description of prior art pertinent to this particular field is contained in U.S. Pat. No. 3,806,864, Broding, et al. An earlier patent in this particular field is U.S. Pat. No. 3,283,295 Montgomery.

In both of these patents, it is pointed out that it is possible to record locally at a convenient spot adjacent a seismometer (or more usually a group of seismometers), the ordinary cumbersome cables used in the prior art having been omitted for ease and portability and increased speed of operation. In U.S. Pat. No. 3,806,864, a radio link is used to turn on selectively from a control point (ordinarily the instrument truck) those specific recorders needed out of a larger total number for a given set of record traces. At each recorder, identification and recording parameter data are partly transmitted from the control point and partly supplied by the individual recorder unit to form the "header" information on the tape.

Field personnel acceptance of this kind of recording system depends chiefly upon having available equipment which confirms prior to each shot or set of vibrations that the desired recorders, and only those recorders, are functional and ready to receive and record the seismic signals picked up by the various seismometers (geophones).

In my copending U.S. application given above (Ser. No. 529,308), one arrangement for providing the field operating crew with confidence that operations will be satisfactory is accomplished by providing what can be called a status alarm. This alarm functions at a particular group recorder when it has been energized (for example as pointed out in my prior patent above) and is presumptively ready for operation. This alarm system is actuated only when the major systems within the group recorder are ready to operate. The alarm provides a visual indication or a sound, or both. Thus, any of the field personnel that are reasonably within sight or sound of the individual group recorders can assure himself that those units are in operating condition just prior to the taking of the data.

In copending Application Ser. No. 562,282, of Francis R. Freeman, filed in the U.S. Pat. Office on Mar. 26, 1975, a single flexible cable is provided which is plugged into all the seismometer group recorders, and a separate playback unit at the recording truck is provided for monitoring playback of the seismometer group recorders. Command signals from the central control unit in the truck are transmitted over this circuit (or by radio) to arrange for a playback unit in any chosen group recorder to playback selected portions of the records stored, the information being converted from coded digitized form to analog form for recording at the truck.

The arrangement described in the Freeman application permits assurance after the record has been made that suitable data have been produced and recorded at whatever group recorder is checked upon. However, it is apparent that such a system requires too much time for routine use in confirming the operation of all group recorders involved in a particular seismic recording. Also, it is desirable to have confirmation of operating status of equipment in advance of a recording rather than subsequent to it. While the system shown in my prior application does this locally for the personnel who are near selected group recorders, it certainly cannot accomplish this when the instruments are laid in rugged terrain, or, as frequently happens, when the instrument layout or seismometer spread may occupy a linear distance of the order of a mile or more.

A quite different system for recording at the central recording unit or truck the output of a plurality of seismometers using a single two-wire transmission line has been described in the Philippe Angelle U.S. Pat. No. 3,652,979. Here, the individual units connecting the seismometers to the transmission line are controlled by pulses transmitted on the line from a pulse generator; by coding the pulses appropriately, the signals arrive at the central unit in any desired time sequence. This system, however, does not provide for a status indicator in advance of operation or recording, so the desired confirmation for the operator is unavailable. In fact, I know of no system at the present time which is immediately adaptable to such a purpose except that described in this specification.

SUMMARY OF THE INVENTION

In my U.S. Pat. No. 3,806.864, apparatus is described and claimed which provides, among other things, for transmitting over a radio link or the like, selected address data which, upon receipt at the various group recorder units, turns on an individual unit in which has been preplaced the equivalent address. This is carried out repetitively until all seismometer group recorders to be used in a particular shot have been activated. Typically, approximately 32 ms is required following each transmission of address number to increment the address and initiate a call code to the next seismometer group recorder (SGR). In the system described herein, receipt of a true address, i.e., the address applying to one preselected group recorder, causes the generation of a confirming signal at that SGR in a transponder transmitter, providing there is verified status that the seismometer cable is connected, a recording cartridge is in place, the cartridge is not at the end-of-tape position, and battery voltage is correct. Preferably, the transponded signal is at a slightly different transmitter frequency from that used at the recorder truck to activate the selected SGR's. This transponded signal is transmitted for less than 32 ms so that, while an address is being sent out, a transponder signal is also generated confirming receipt of the previous address and proper status. Back at the recorder truck, this transponded signal activates a unique indicator lamp on a control board at a location equivalent to that of the seismometer group recorder that has just been activated. Thus, for example, if 96 of such indicators are located on such a control panel, representing 48 stations for SGR's forward and 48 similar SGR stations behind the source point for seismic waves, the call sequence would call out the desired address sequentially, for example, from the lowest to the highest numbered address forward and reverse, and the indicator lamps would "latch on" in a pattern representing the individual SGR numbers activated. This produces a display of the group pattern. Any failure of a unit is immediately apparent. Preferably, the display is maintained in the "on" condition for the duration of that particular record. A reset pulse at the end of the record time operates to turn off the entire display and return it to a "ready" condition prior to the next record.

DETAILED DESCRIPTION OF THE DRAWINGS

Figure 1:
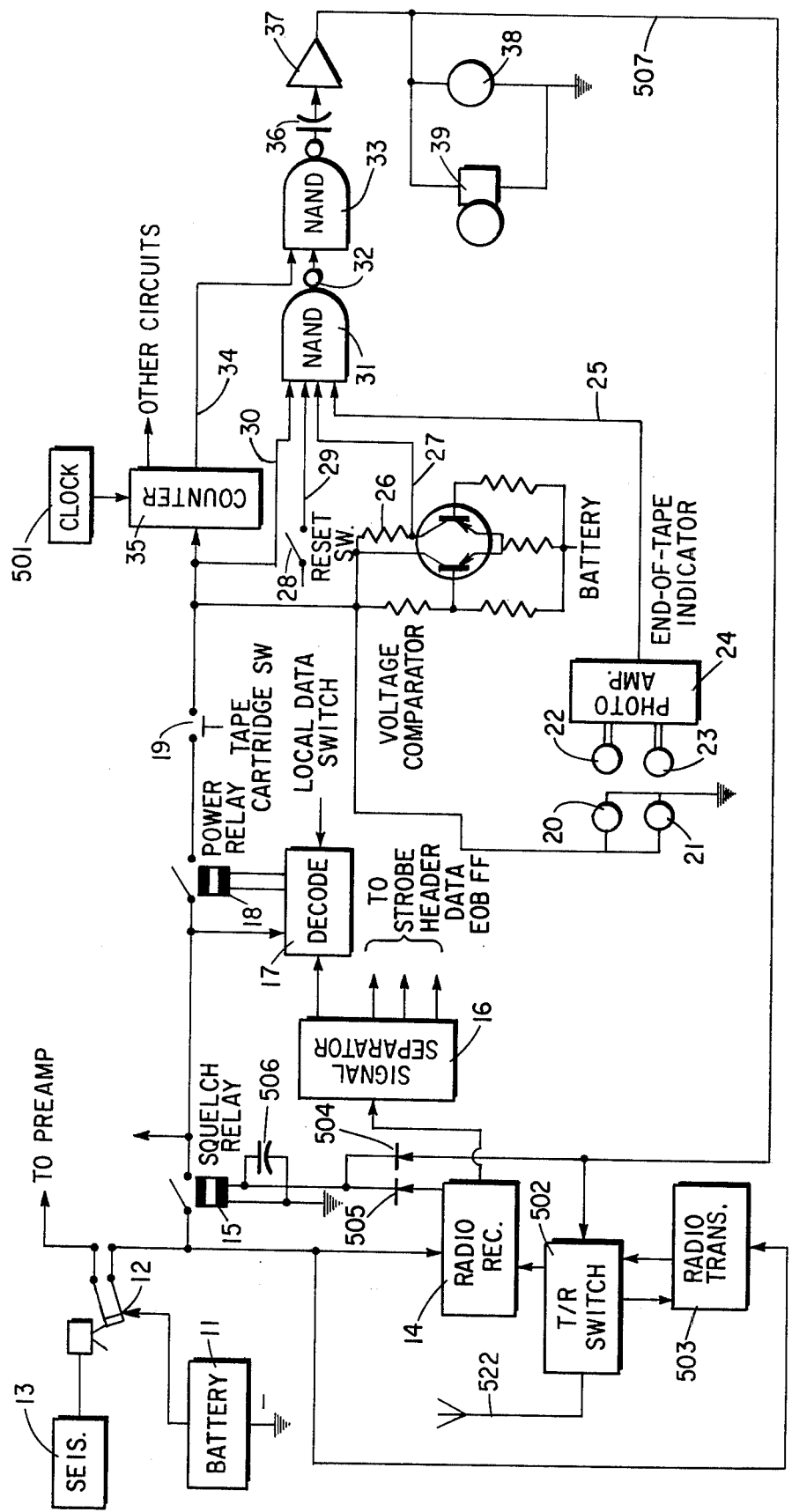
FIG. 1 is a block wiring diagram of a status indication and transponder-transmission system employed at the SGR.

FIG. 1 is largely adapted from the figure in my pending application Ser. No. 529,308, made a reference. This shows not the entire SGR, but the status alarm system in it, suitably modified for transponder operation. In addition to the units provided in that prior application, I have shown a clock 501, the pulses of which are inherently required to operate any counter, such as counter 35, a transmit/receive switch 502, and a radio transmitter or transponder 503. Additionally, there are two switching diodes 504 and 505, and a holding condenser 506 across the coil of the squelch relay 15.

It has been described in the copending application Ser. No. 529,308 that, after the radio receiver 14 has received a set of coded signals from the transmitter at the recording truck at transmission frequency $F_1$, the address signals received are routed by separator 16 to the decoder 17 to be matched against the local data (that is, the local address), so that power relay 18 is closed when the address is "true", i.e., the received address matches the local address. Following this, as more specifically described in that copending application, if the seismometer 13 has been plugged into the jack 12, a cartridge carrying the recording medium is in place, this cartridge is not at the end of the recording tape, and the battery voltage is correct, a signal is presented to amplifier 37, which actuates the visual and oral alarms 38 and 39. In the current arrangement, another line 507 leads from the output of the amplifier 37 both to the transmit/receive switch 502 and the switching diode 504. In this case, the counter 35 counts for 30 ms. At this time, the output from the counter is obtained which enables the transmit/receive switch. His actuation switches the radio receiver off the antenna and connects the antenna to the radio transponder or transmitter 503. After 30 ms of transmitting, the counter 35 output flips off, stopping the output signal on line 507, and the transmit/receive switch 502 transfers the antenna back to the radio receiver and turns off the transmitter. Capacitor 506 across the squelch relay insures that this relay does not drop out in the transferring process from radio transmitter 503 to receiver 14. Preferably, the transmitter 503 operates on a frequency $f_2$ differing from $f_1$, the transmitting frequency of the transmitter at the control unit. This allows the SGR receiver 14 to be tuned to sense only signals from the control unit and, in turn, all transponded signals act only on a receiver tuned to frequency $f_2$ at the control unit.

Figure 2:
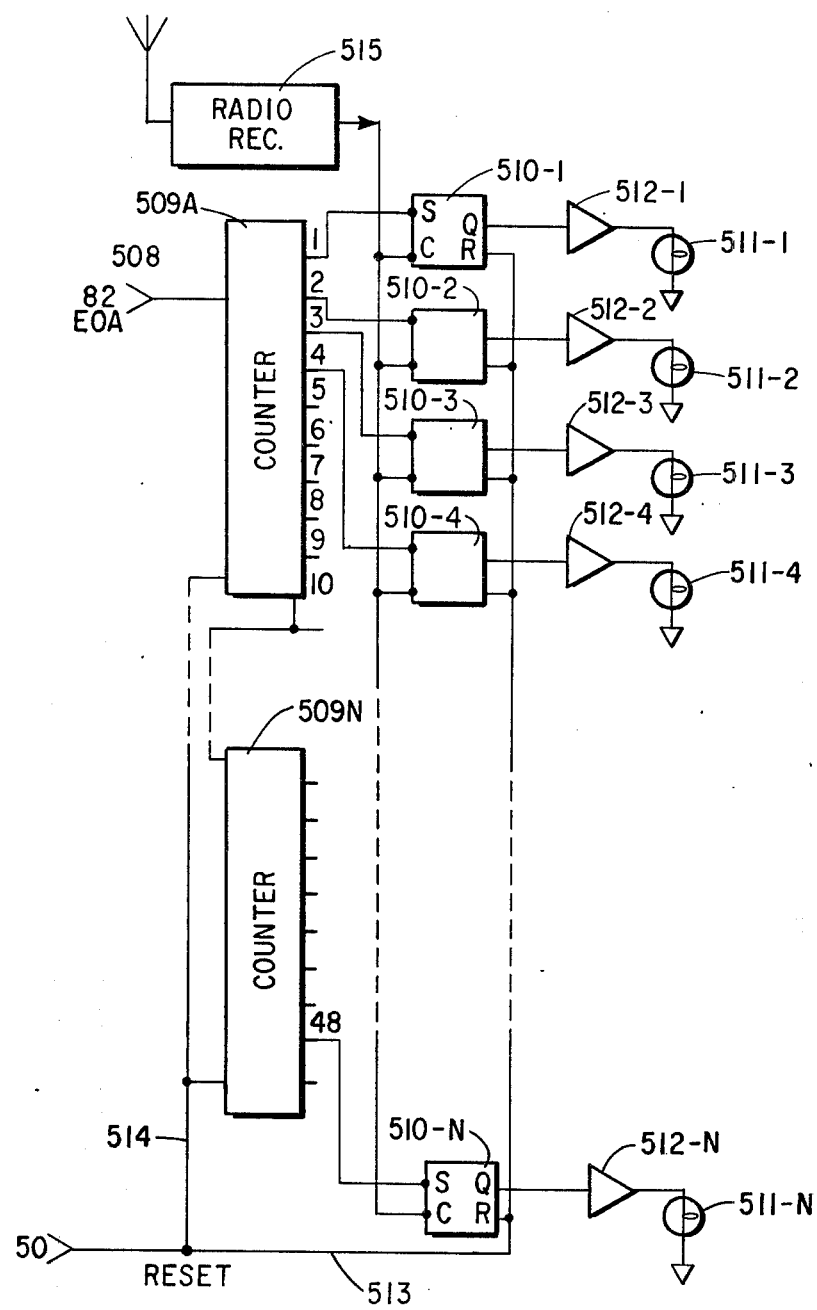
FIG. 2 is a block wiring diagram of equipment employed at the control unit or instrument truck, which actuates the indicator lights on the control panel at the instrument truck to complete the status display.

Reference is now made to FIG. 2, and also to FIG. 2 of U.S. Pat. No. 3,806,864. Referring specifically to that latter figure, it will be recalled that an end-of-address pulse is generated by the address logic and put on line 82. A connection is made from this line to line 508 of FIG. 2 of this application, where it serves as input to an array of counters which are connected in concatenation, units 509A to 509N. A count advance registers on the outputs for each pulse input from the end-of-address line 508. The duration of this pulse is the address rate or essentially 32 ms for a 3-digit call or 22 ms for a 2-digit call. The output terminals (for example, terminals 1 to 10 on unit 509A) are individually connected to the S terminals of N flip-flops 510-1 to 510-N. If a radio signal is received during the time-enabling period mentioned immediately above, the appropriate flip-flop 510-1 to 510-N is set. (Note: Since the transponded signal must follow the address call, the appropriate radio output signal is one count behind the counter or end-of-address pulse. This is not problem as the next count is appropriately set into that following flip-flop.)

When the appropriate flip-flop is set, it in turn actuates an individual indicator lamp of the set 511-1 to 511-N through the lamp driver 512-1 to 512-N. Thus, the appropriate flip-flop in the set 510-1 to 510-N remains set and the indicator lamp corresponding to the particular transponded signal remains on until the start of the next record. At this point, since the reset terminals R of all of these flip-flops have been connected together and to the reset line 513 and 514 (serving the counter bank), a pulse which is obtained from line 56 of the circuit shown in FIG. 2 of the patent cited turns all the lamps off and permits the cycle to start again.

The radio signal was received on radio receiver 515 through its antenna, the set being tuned to frequency $f_2$ and the radio receiver output being connected to all of the C terminals of the flip-flops in the set 510-1 to 510-N.

By the above procedure, the transponder signal received from each SGR unit called will light an appropriate lamp in the call pattern. This lamp will remain on until it is reset. Those SGR units on the pattern that do not respond will not cause actuation of the corresponding lamps and this lack of illumination is easily detected. Since the calls jumped over, as in the forward and back drops, are not transmitted, it is necessary that representative "end-of-address" (EOA) pulses be generated for each address jumped over. In this manner, the physical pattern of the spread is indicated in the illuminated lamp pattern.

FIGS. 1 and 2 of U.S. Pat. No. 3,806,864, together with the associated descriptive material, have shown how one may employ a transmitter provided with a particular arrangement of digitized logical circuit elements, selectively to turn on a group of desired SGR's out of a much larger group. For example, in that FIG. 1, for a particular seismic source located adjacent to seismometer location 428, the SGR units which are activated are 430–433 ahead of, and 423–426 behind the source position. As the source location is changed to adjacent SGR 429 position, suitable changes are made via the radio transmitter so that SGR's 431–434 are activated ahead of the source and units 424–427 behind it.

Figure 3:
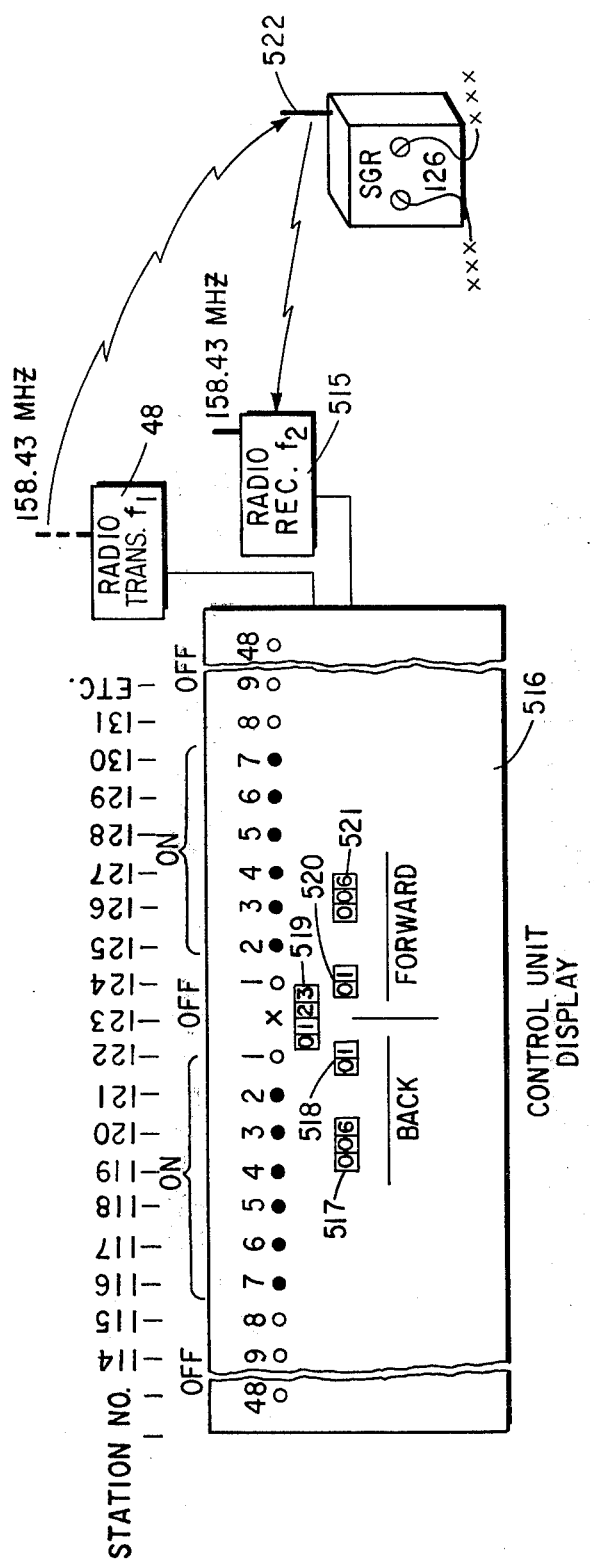
FIG. 3 shows in diagrammatic form the overall arrangement of the control unit display with relation to the radio link.

In FIG. 3 of this application, the front of the control unit display panel 516 is shown, together with the multiple contact rotary switches 517–521, which are employed in conjunction with the matrix unit 30 (of FIG. 2 of the patent cited) which suitably put in the matrix the addresses of the SGR's which are to be actuated for the next shot, as well as those that are not. Thus, the central switch 519 has set in it at the instant shown that the source point for the next recording is at location 123. By setting these dials, the SGR located at point 123 on the spread is deactivated, or more precisely this address will not be transmitted by the transmitter for this particular recording. The rotary switches 518 and 520 similarly act to specify the relative number of SGR's adjacent to the source point which also have deactive addresses. In this particular case, the setting in of the number 01 on switch 518 causes the SGR at unit 122 to be "dropped", i.e., this address will not be transmitted and the corresponding SGR 122 will not be activated. The same is true for the switch 520 as far as the forward direction is concerned, in this case showing that SGR unit 124 will not be activated. The rotary switch 521 shows by its number 006 that the next six SGR locations following 124 are to be activated for the particular recording, while the setting on switch 517 shows the identical arrangement for SGR units lying in back of the source point. (Perhaps it should be mentioned that this particular apparatus is used to select the desired arrangement of SGR units in a spread, but there is no requirement that any particular kind of source be employed, i.e., an impulsive source, steady-state, or quasi steady-state, etc.)

When the start switch 56 (FIG. 2 of the patent cited) is closed, the scanners for the address matrix 32 and 33 are energized so that the transmitter 48 at transmission frequency $f_1$ commences operations as described in U.S. Pat. No. 3,806,864. For illustrative purposes, one SGR, located at position 126, is illustrated in FIG. 3. As already described in connection with FIG. 1 of this specification, the radio receiver 14 at this particular SGR is ready to receive the transmission at the frequency $f_1$ from transmitter 48. As soon as this unit receives the coded address which is identical to that which has been set into this SGR (through local data switch 17) the switch 502 turns on the radio transmitter (transponder) which then transmits at frequency $f_2$ over the antenna 522 the acknowledgement that the address has been received and that the unit is ready to record seismic waves. This is received by radio receiver 515 tuned to frequency $f_2$, which thereupon energizes the appropriate flip-flop 510 which had been just previously set by the concatenated counters 509. This, as previously described, causes illumination of the instrument light 511 corresponding to the address; in this case unit 126 on the control panel 516. This particular indicator lamp location is indicated by number 523 on the control board. As previously stated in connection with FIG. 2, once this indicator has been turned on, it continues to glow throughout the recording and is only turned off when a restart set pulse is applied through line 513 from line 56.

This entire operating sequence is repeated for all of the addresses forward and back from a source point, so that ultimately, and in fact before transmission of the header information, those SGR unit locations which have been activated for the next recording are all glowing on the control unit display for the panel 516.

Figure 4:
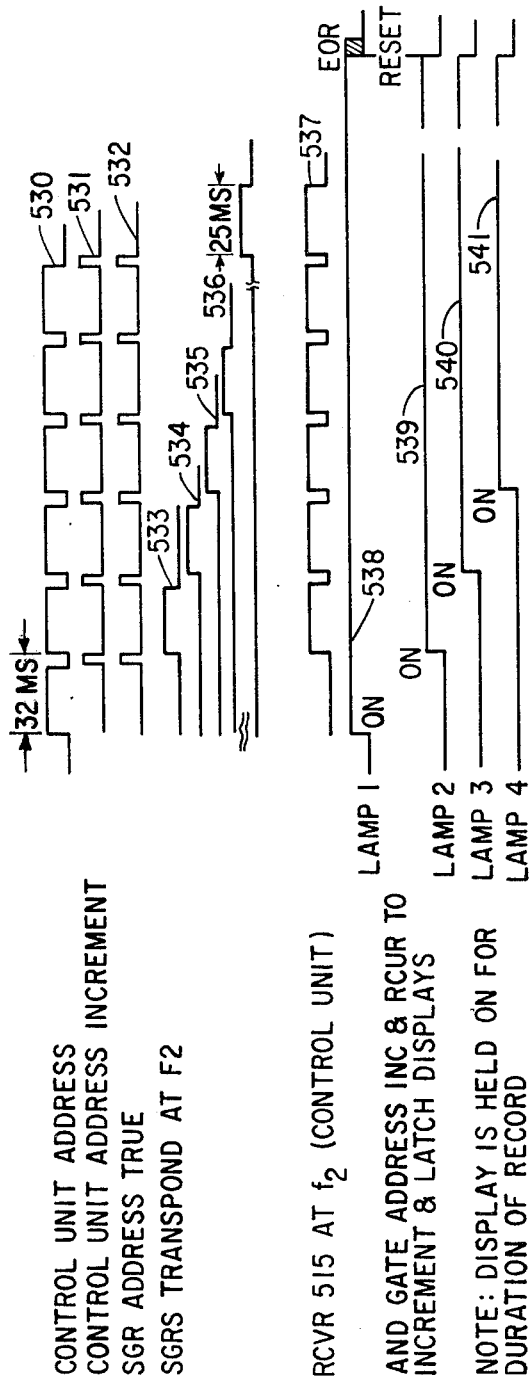
FIG. 4 illustrates various time relationships at the recording truck in this invention.

FIG. 4 shows timing sequences which are of importance in connection with this mode of operation. Trace 530 shows a graph of the off and on sequences for the control unit address system, the initial position of the line being in the "off" position. As was mentioned in the patent cited, each address is sent out during a 30-ms period of time followed by a 2-ms period of transmission silence, which in turn is followed by the transmission of the next address, and so on. During the period that the transmitter is "off", the apparatus already described in FIG. 2 of the patent scans the matrix 30 and places into the shift register the incremental information for the succeeding address. This is on trace 531. On trace 532, is shown the initiating pulse for each of a number of individual SGR units.

Trace 533 shows the time intervals at which selected SGR's transpond at the frequency $f_2$ back to the control unit. Thus, trace 533 shows that the SGR transponder at SGR location 125, having received an "address true" signal through the transmitter 48 in the preceding time pulse (referred to trace 530) transponds during a major part of the next time interval back to receiver 515 the confirmation that the address true has been received at this unit and that it is activated and its status is ready for recording. On trace 534, one sees that the transponding unit 126 operates sequentially later since its address true signal occurs during the second transmission of addresses, as shown on trace 530, and so on. The receiver 515 action is shown by trace 537, where it is seen that at frequency $f_2$ this receiver is caused to respond to the transponded signals from units 125, 126, 127, etc., at succeeding intervals of time. Thus, the first "on" pulse at this receiver corresponds to the "on" pulse on trace 533 at the SGR location 125; the next "on" period corresponds to the transponding shown on trace 534 from SGR unit 126, and so on. Trace 538 similarly identifies the "on" time for the receiver 515. It is turned on at the same time as the transmitter 48 and continues to receive until it is shut down by the EOR pulse at the end of the recording, which resets this receiver, i.e., shuts it off.

Traces 539, 540, and 541 simply show the status at various lamps set up on the control unit display panel. It will be recalled that the arrangement of the rotary switches 517–521 on this panel in FIG. 3 indicate that lamp 1 to the right is never turned on during this particular recording. Trace 539 shows the status of off and on periods for lamp 2, which is next in line to the right. The first time the receiver 515 receives a transponded signal, which corresponds to the SGR at station 125, it sends a pulse on its output line which will activate the corresponding flip-flop in a 510 bank, which as earlier described in connection with FIG. 2 causes this lamp to be latched in the "on" position until the end of recording pulse is received, as shown on trace 539. Secondly, lamp 3, the third lamp to the right in this control panel, is turned on by pulse from the radio receiver 515 when the second transponded signal arrives, as shown on trace 540, etc. Accordingly, the various indicator lamps (preferably light-emitting diodes) are turned on and latched on sequentially until all of the addressed units have been interrogated and transponded. It is important to note that if any such unit is in an unready status (for example, because the recording medium is at the end-of-tape position) the described apparatus in the SGR will not transpond and the corresponding indicator lamp will not be illuminated. Accordingly, the operator of the seismic group can satisfy himself automatically just at the start of the recording period that all of the units in the desired spread pattern have been activated and are carrying out the predetermined sequences of recording events.

It is evident to anyone skilled in the art that although the system as described relies on the operator making a visual check of the status lamp pattern to qualify that all SGR units are ready for recording, it is evident that the pattern can also be used as a reference to a comparator so the status check can be automatic even to the point of inhibiting the shot unless the minimum acceptance for recording stations is met. No other known system can provide for this feature.

This is a great assistance in permitting the crew operator to reassure himself that all units are in readiness just as the time the seismic source is to be actuated. This invention of itself does not furnish convincing evidence that the subsequent recording took place; as earlier mentioned in this is the subject of the copending Freeman, U.S. Pat. application Ser. No. 562,282, entitled "Seismometer Group Recorder Field Monitor."

As described above, this transponder system preferably makes use of two very closely associated but different transmission frequencies $f_1$ and $f_2$. It is not to be considered, however, that the invention is limited to that arrangement. A slightly more complex arrangement using a single transmission frequency both at the control truck and at all of the SGR units produces a transmission pattern similar to trace 530, FIG. 4, but differing from this in that each alternate "on" period is omitted. The transponded signal indicating the status (such as trace 533) is arranged by logic units well known in this art to transmit back at the identical frequency of the control unit transmitter 48 during the time that that transmitter is temporarily off the air. Trace 533, for example, would occur just as shown in FIG. 4. On the other hand, trace 534 from SGR unit 126 would respond in the time period corresponding in FIG. 4, trace 530, to the fourth "on" period. While this essentially doubles the total time involved for activating the necessary SGR units for a particular shot, it is a perfectly practicable arrangement. Other arrangements of a slightly more complicated nature can be employed to shorten this total time. These again are already known to those skilled in the radio transmission of a plurality of messages. This particular invention is certainly not to be considered limited to the embodiment shown and described.

It is also to be understood that the concept shown can be expanded without invention to make a display for offset lines or an areal display on the control panel. All recorders called would transpond to generate a display of the predetermined pattern desired for a particular shot. For example, a cross array can be programmed and displayed essentially as the arrangement already described.

Basically, what has been shown is apparatus and a method for transponding a plurality of addressed SGR units providing that the status for each such unit is true (that is, operative) and displaying the relative position of the SGR units. In the system shown, the transponding and display actuators do not add additional time to the group calling or actuation provided a separate transponder frequency is available for use. Transponding on the same frequency requires intermittent operation of the control transmitter synchronous with the SGR transponders. As a result, the time for transponding on the same frequency is roughly 32-ms times the number of address stations, or a little over 1.53 sec for a 48-station transponder operation.

This transponder operation can be made optional, of course. By this means, only occasional checks are made to verify the operational status of the predetermined groups of the SGR units. Two-dimensional display panels of the indicator lamps or equivalent can be easily provided for areal displays of patterns. It is found that the unit cost is not really objectionable; the use of this transponder display panel is well worthwhile considering the confirmation made to the seismic party operator.

I claim,

1. In apparatus for seismic geophysical surveying comprising means for generating seismic waves in the earth at one source location within a survey area that includes a plurality of spaced source locations, a plurality of transducer means distributed over said area for receiving said seismic waves after travel through the earth from each of said source locations to each of a plurality of receiving locations spaced from each other within said area, a plurality of recorder units each being connected to the output of at least one of said receiving transducer means and adapted to reproducibly record the output from those transducer means connected to it, all of said units being in a standby status to receive only communications until energized by connection to a supply of electrical power to record a trace, each said unit being positioned in said area near the receiving location occupied by said connected receiving-transducer means, each of said recorder units including means responsive to one of a set of coded signals transmitted over a communications link from a control point, to connect said recorder unit to a supply of electrical power, means for recording a first sequence of signals representing record-identification and recording parameter data, and means for recording a second sequence of signals representing wave-amplitudes characterizing the seismic waves arriving at said connected receiving-transducer means, said apparatus including also means at said control point for transmitting at a frequency $f_1$, a set of coded signals to energize only those of said recorder units forming a recording array having a desired relationship to said one source location, to record the plurality of traces forming one multitrace seismic record, the improvement comprising
 automatic means in each of said units interconnected with the recording system thereof for producing a status signal only where
   a. at least one of said transducer means is operatively connected to said unit,
   b. a cartridge containing a reproducible recording medium is inserted into said unit,
   c. said medium is not exhausted, and
   d. said supply of electric power has at least a predetermined voltage,
 a transmitter in each of said units transmitting at a frequency $f_2$ differing from $f_1$, automatic means in each of said units responsive to said status signal for energizing said transmitter to form a communications path to said control point and to transmit over said path a status ready signal, receiving means at said control point responsive to said path to receive each said status ready signal from each said unit energized, and automatic means at said control point connected to said control-point receiving means and responsive separately to each transmitted status ready signal to produce a separate visual indication of each of said status ready signals received, a. said means to produce said separate visual indication including a plurality of indicator lights mounted on a panel at said control point in a pattern at least approximately similar to the location pattern of a plurality of said units, and b. said status ready signal responsive means including (1) a separate circuit for each indicator light activated upon transmission of only one of said coded signals, but said circuit being energized to turn on the corresponding indicator light only upon reception during transmission of the next coded signal of a status ready signal from one of said units, and (2) latch means in said circuit for prolonging the energizing of said light for at least the majority of time in which said unit is recording, whereby at said control point, one may ascertain at a glance and in advance of recording said outputs from said transducers either that all units in a predetermined pattern (less than the total number of said units) are in status ready condition, or, in the alternative, the pattern position of any of said units that are not ready.

* * * * *